Patented Apr. 28, 1936

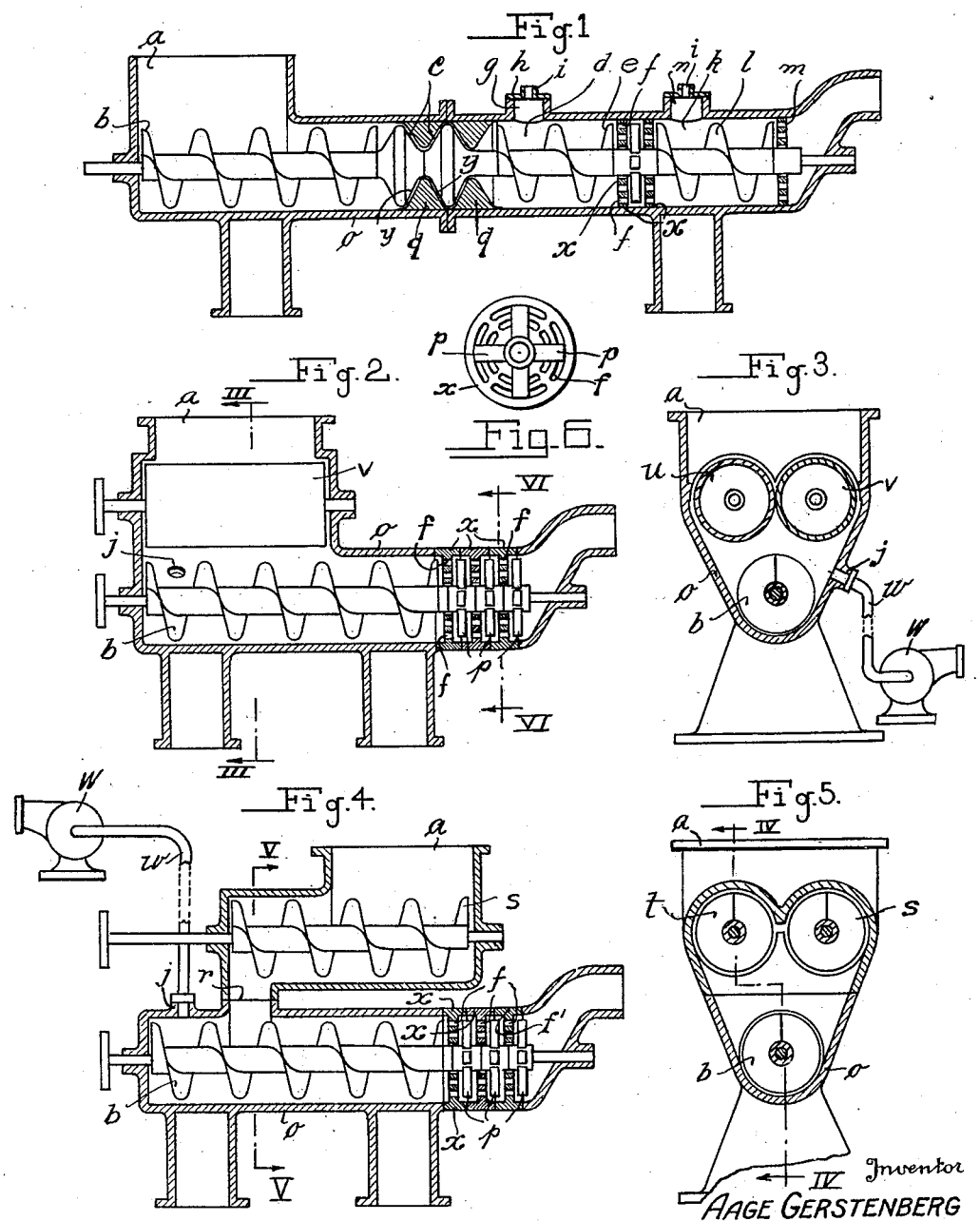

2,039,162

UNITED STATES PATENT OFFICE 2,039,162

KNEADING MACHINE FOR MARGARINE AND THE LIKE

Aage Gerstenberg, Frederiksberg, near Copenhagen, Denmark

Application August 5, 1933, Serial No. 683,912
In Denmark August 16, 1932

9 Claims. (Cl. 31—35)

In the manufacture of margarine and other edible fatty substances to be cooled down on rotary cooling drums or in a jet of cold water, the cooled product is, as it is well known, subjected to a kneading process, by which the substance becomes more homogeneous and acquires a suitable consistency. Formerly, this kneading was performed in open kneading machines containing kneader worms or kneader rollers, by means of which the substance was treated. These open kneading machines were subject to various drawbacks and disadvantages, among which for instance was the fact that they were not continuously operative. The demands for greater economy and a more hygienic manufacture of foodstuffs brought about a gradual change to the use of wholly or partly closed kneading machines, which offered the possibility of more satisfactory hygiene and the attainment of a continuous operation.

Continuously operating wholly or partly closed kneading machines, however, have thus far proved open to the objection that the rather large quantities of air contained in or adhering to the loose product coming from the cooling drum and having to be kneaded cannot escape during the kneading process, for which reason the finished product contains numerous fine air bubbles. These air bubbles have a spoiling effect, such, for instance, that margarine treated in continuously operating kneading machines of the kinds heretofore known, will get the appearance of having been greatly discoloured during the kneading process.

Attempt has been made to avoid this drawback by adding more colouring substance to the margarine. As the latter, however, as a rule after the kneading, has to be packed by means of a packing machine, it will thereupon be exposed to a compression effect whereby a part of the air bubbles will burst. Accordingly the parts of the margarine where this happens will again assume their original colour, with the consequence that the finished packed margarine will have a spotted or striped appearance, whereby its value as a commercial commodity will be reduced.

This circumstance is well known, and it has been tried to avoid discolouring of margarine during the kneading by performing the latter in hermetically closed vessels or chambers exposed to a partial vacuum, whereby the air in the margarine will be removed. This method of kneading under vacuum, however, is highly complicated and costly, and involves additional work by precluding a continuous operation. Kneading of margarine in hermetically closed kneading machines can in fact be effected only by discontinuous operation, in which a suitable quantity of margarine is placed in a closed chamber, after which the latter is closed hermetically. The said chamber is then exposed to a partial vacuum, and the kneading is then as a rule carried out during the course of two to five minutes. The operation must then be stopped, the apparatus opened, the margarine removed and a fresh quantity of margarine put in. This manner of operation is obviously very uneconomical.

The present invention has for its object to avoid this drawback by a novel combining of continuously operating kneading machines with means for reducing the air pressure in one or more parts of the kneading chambers, during the continuous operation.

A condition to be fulfilled where the air contained in the margarine or introduced therewith into the kneading machine is to be removed from the margarine during the kneading, is, that the substance under treatment shall be caused, at two or more places, to fill completely the free passage area through the kneading apparatus, and to provide, with respect thereto or between any two of such places, a region in the kneading machine in which a reduced pressure can be created by an exhaust of air by way of a vent opening provided, for the region concerned, in the casing of the kneading machine.

In order that the substance under treatment shall not obstruct the vent opening, it will ordinarily be necessary to relieve the pressure on the substance around the location of said opening by providing, in the said reduced pressure region, a conveyor member actuating the substance and moving the same away from the said opening and, thereby, causing the substance around the opening to be entirely relieved from any pressure. In order to secure an air-tight sealing of the passage area in the kneading apparatus, resistance members are provided before and behind the region concerned from which the exhaust is to be effected, substance being pressed against the said resistance members by the kneader members or other devices for moving the substance forward, in such a manner that the substance will accumulate in front of the resistance members to such an extent that the passage area at the said members will be filled entirely with the substance.

The vent opening is connected preferably to a suction pump or some other suitable suction device adapted to maintain continuously a partial vacuum suited to the removal of the air from the substance under treatment.

The further details of the invention will appear from the following description of the constructions of a kneading apparatus embodying the same, as illustrated by the attached drawing.

Figs. 1 and 2 somewhat diagrammatically represent longitudinal sections of two different constructions of a kneading machine according to the invention, Fig. 3 is a cross-section of the kneading machine shown in Fig. 2, taken on the line III—III thereof, Figs. 4 and 5 are respectively, a longitudinal section and a cross-section of a third construction of a kneading machine, the former being taken on the line IV—IV of the latter and the latter being taken on the line V—V of the former; and Fig. 6 is a section on the line VI—VI of Fig. 2, illustrating a detail.

Referring first to Fig. 1, $a$ is the supply hopper of a continuously operating kneading machine, which mainly consists of a casing $o$ with kneader members $b$, $c$, $e$, $l$, of known kind provided therein. The margarine or other fatty substance to be treated is introduced by way of said hopper $a$ and is pressed by the worm $b$ into a narrow annular space $y$ formed between the kneading members $c$ comprising rotary disc-shaped elements carried by the worm shaft, and stationary annular ring or partition members $q$ provided inside the casing. The margarine will accordingly entirely fill said space $y$ under pressure from the worm $b$ forcing it therethrough. Under the passage through this space the margarine is subjected to a kneading by the action of said rotary members $c$ working against said stationary members $q$, after which kneading the consistency of the substance will be of such a nature that a removal of the air from the same can take place readily.

From the kneader members $c$, the margarine passes into a chamber $d$, where it is caught by a worm $e$, which forces the same through openings $f$ in one or more resistance bodies $x$ provided in the kneading machine. These openings $f$ are of such a size that the resistance they offer against the passage of the substance is sufficiently high to cause the substance, while actuated by the worm $e$ to fill the passage area completely, and at the same time, the air bubbles in the margarine will be compressed and broken up, whereby the air in these bubbles will be released and discharged into an escape passage $g$, by way of which the chamber $d$ communicates for instance with the atmosphere through a vent opening or pipe $i$. In order to facilitate the removal of the air, this vent opening or pipe is generally connected to a suction pump (not shown) or to some other suitable device for sucking away the air, such for example as the rotary exhauster device W shown connected by pipe $w$ to the nipple $j$ in Figs. 3 and 4. The opening $g$ itself is closed by a cover $h$, in which the vent pipe $i$ is formed or to which it may be connected.

The aforementioned resistance bodies $x$ in which the openings $f$ are provided, may be of various constructions known per se, or may be replaced by one or more restricting means in the part of the casing of the kneading machine where the partition walls are provided in the construction shown in the drawing. After the margarine or fatty substance has passed through the openings $f$, it may be further treated to free air therefrom by again subjecting it to such mechanical working as by similar kneading means comprising the worm $l$ serving to press the substance through openings $m$ in a transverse partition disposed in the kneading chamber behind said worm $l$. The part $k$ of the casing of the kneading machine in which this worm $l$ is situated would then be fitted with an escape passage $n$ similar to the passage $g$ for the same purpose.

The worms $e$ and $l$, of which the latter may if desired be omitted together with its corresponding part of the casing of the kneading machine, are constructed as conveyor worms with such a pitch and capacity for conveying the substance as to carry it past the air escape passages $g$ and $n$ without permitting any part of the substance to be pressed out through said passages or their associated vent openings.

In certain cases it may be desirable to provide several air escape passages (like $g$ and $n$) in succession at various points of the movement of the substance through the kneading machine and, if desired, such several passages may be so formed with associated vent openings and suction connections as to provide unequally reduced pressures in the various parts of the kneading machine, commencing with a relatively high air removing suction at one end and gradually reducing the same toward the other end of the machine. Hereby the advantage can be attained that all the conveyor members (the worms $e$, $l$ . . .) will have mainly the same back pressure to overcome.

The construction shown in Figs. 2 and 3 differs from the one shown in Fig. 1 in that the worms $e$ and $l$ and the kneading members $c$, together with their corresponding parts of the casing of the apparatus are omitted. In this construction the removal of air is effected by way of a vent opening or nipple $j$ (corresponding with the opening or pipe $i$ of Fig. 1) formed in the wall of the casing $o$ surrounding the worm $b$. This opening or nipple $j$ is intended to be connected through suitable piping $w$ with a suction device or pump W like its corresponding part in Fig. 1. The mass to be treated is supplied to the worm $b$ by means of two feed rollers $u$ and $v$ provided in the hopper $a$, and is pressed by said worm $b$ through the openings $f$ of the resistance plates $x$, between which rotary kneader members $p$ in the form of radially disposed paddle blades (see Fig. 6) are disposed. By way of said nipple $j$ with its suction connection, a partial vacuum of suitable magnitude is produced in the interior of the kneading machine. While actuated by the feed rollers $u$ and $v$ the substance will form an air-tight seal between the rollers themselves and between said rollers and the inner face of the hopper $a$.

The construction shown in Figs. 4 and 5 differs from that shown in Figs. 2 and 3, mainly by the feature that the feed rollers $u$ and $v$ are replaced by worms $s$ and $t$, and by the feature that the nipple $j$ is in this instance disposed in the kneading chamber $o$ in front of the supply opening or feed passage $r$, by way of which the substance is conveyed from the hopper $a$ to the worm $b$. Said nipple $j$ may be connected with a suction pump W (see Fig. 4) the same as in Fig. 3. The substance itself maintains the opening $r$ air-tightly sealed.

A feature common to all the aforedescribed constructions is that the vent opening $i$ or its equivalent nipple $j$, through which the air from the kneader members is discharged or sucked away, is disposed in such a manner, relatively to the conveyor devices for the substance worked upon by the apparatus concerned that the said conveyor devices move the substance away from the air escape passages and thereby prevent the substance from entering into the same so as to close them or leak out.

In the machines described, all the rotary members, excepting the feed rollers $u$ and $v$ and the feeder worms $s$ and $t$, are disposed on one common shaft, but the scope of the invention will not be departed from constructing the machine with any suitable number of shafts placed side by side or end to end, either in a separate chamber or all in the same chamber.

In comparison with the heretofore known continuously operating kneading machines, the machines herein set forth offer the advantage that they simultaneously perform the kneading and remove the air from the margarine, in such a manner that the latter retains its colour unaltered, or substantially unaltered, and will appear as a uniformly coloured product.

If the margarine, before being introduced into the kneading machine, has been subjected to a preliminary kneading, then the kneader members $c$ and perhaps also the worm $b$ may be omitted, or else the number of kneader members may be reduced.

Having now particularly described and ascertained the nature of my invention and in what manner the same is to be performed I declare that what I claim is:—

1. A kneading apparatus for margarine and the like material, comprising a casing having a feed inlet and outlet, means provided in the casing for kneading the material so as to liberate air therefrom, means providing for the expulsion of the liberated air from the casing as it is forced out of the material by the kneading action, and means permitting a continuous feeding and discharge of the material through the casing while subject to the air expulsion therewithin.

2. A kneading device for margarine and other fatty substances, comprising a casing having inlet and outlet openings, kneading members operable within the casing, means for creating a partial vacuum in the kneading space of the casing, and means permitting a continuous feeding and discharge of material through the casing while under vacuum therewithin.

3. A kneading device for margarine and the like, comprising a casing having a feed inlet and outlet, means for kneading the material within the casing, means provided for the suctional withdrawal of air from a part of the casing where the kneading occurs, and means permitting a continuous feeding and discharge of the material through the casing while under said suctional action therein without allowing any of the material to be drawn into the suction passage.

4. An apparatus for kneading margarine and the like in a continuous operation, comprising a casing, a number of kneading members including rotatable parts mounted in the casing, a vent opening in the wall of the casing adapted for connection with a suction device and means permitting continuous feeding and discharge of the material while under vacuum within the casing created by the suction device; said means being adapted to prevent the material from penetrating into the vent opening during its passage through the apparatus.

5. A device for kneading margarine and the like in a continuous operation, comprising a casing, a number of kneading members including rotatable parts mounted therein and through which the margarine is passed through the casing, an inlet through which the material is supplied, an outlet through which the material is discharged, and a vent opening in the wall of the casing; said opening being located in advance of the kneading members which remove the material from the region thereof simultaneously with the air expulsion therethrough so as to prevent the material from entering the same.

6. An apparatus for kneading fatty substances such as margarine and the like in a continuous operation, comprising a casing having an inlet and an outlet, kneading means including a motivating member rotatably mounted in the casing and having associated means for driving the same, a vent opening in the wall of the casing permitting the expulsion of air therefrom during the action of the kneading means upon the substance, a suction device connected with said opening, and means including said motivating rotatable member for continuously feeding and discharging the substance through the casing while under the action of said suction and at the same time preventing the substance from penetrating into said opening.

7. The improvement in continuously operable kneading machines for margarine and other fatty substances, which consists in the provision of a vent opening through the casing or operating chamber of the machine between spaced locations of kneading members, through which opening air from the substance is drawn while the substance is forced in a forward direction so as to completely fill the space between said member locations without itself being drawn through or into said vent opening, and means permitting continuous feeding and discharge of the substance through the machine while under such air drawing action.

8. The method of preventing discoloring of margarine in a continuous kneading operation, which consists in feeding the margarine continuously into a closed casing having kneading members therein and continuously discharging the kneaded margarine from the casing, subjecting the margarine to a vacuum for the withdrawal of air therefrom while in its passage through the kneading members in continuous feed and discharge through the casing, and preventing the margarine from being drawn from the machine by the action of the vacuum so applied.

9. The method of preventing discoloring of margarine or other fatty substances in a continuous kneading process, which consists in continuously passing the substance through a machine performing a kneading operation thereon, subjecting the substance in its continuous passage to a vacuum during the kneading operation thereupon in order to withdraw air from the same and simultaneously preventing any of the substance in passage from being drawn from the machine by said vacuum.

AAGE GERSTENBERG.